United States Patent [19]

Bettini

[11] Patent Number: 5,148,860
[45] Date of Patent: Sep. 22, 1992

[54] THERMAL CONTROL APPARATUS FOR SATELLITES AND OTHER SPACECRAFT

[76] Inventor: Ronald G. Bettini, 2578 Spruce Creek Blvd., Daytona Beach, Fla. 32014

[21] Appl. No.: 594,410

[22] Filed: Oct. 9, 1990

[51] Int. Cl.⁵ .............................................. F28F 7/00
[52] U.S. Cl. ...................................... 165/41; 165/81; 165/82; 165/185
[58] Field of Search ...................... 165/81, 82, 185, 41; 29/890.03

[56] References Cited

U.S. PATENT DOCUMENTS

| | | | |
|---|---|---|---|
| 3,722,579 | 3/1973 | Hitchcock et al. | 165/185 |
| 4,448,240 | 5/1984 | Sharon | 165/185 |
| 4,789,023 | 12/1988 | Grant | 165/41 |

*Primary Examiner*—Albert W. Davis, Jr.
*Attorney, Agent, or Firm*—Edward M. Livingston

[57] ABSTRACT

Heat from heat-generating components (13) requiring cooling in a space vehicle (2) is transferred to a heat radiator (5) through a heat-conductive cylinder (3) and heat-conductive sleeve (6) in thermal-communication contact between the heat radiator (5) and a base plate (1). Heat can be conducted to the heat-conductive cylinder (3) through a flexible heat conductor (14) in the form of a flexible heat-strap or a rigid heat conductor with flexible connection at either or both ends. The base plate (1) can be attachable to the outside or to the inside surface of an exterior portion of the space vehicle (2). If attachable to the inside surface, the entire thermal-control device can be extendable from an inside position in the vehicle. A cold plate (24) with optional laser-beam and heat-deflective construction can be positioned at the opposite side of the heat radiator (5) from the base plate (1) and can be swivelable to maximize resistance of sun heat or hostile laser beams. The space vehicle can be any form of spinning or non-spinning satellite or a space-transportation vehicle.

31 Claims, 2 Drawing Sheets

THERMAL CONTROL APPARATUS FOR SATELLITES AND OTHER SPACECRAFT

BACKGROUND OF THE INVENTION

This invention relates to passive removal of heat from heat-generating components on satellites and other spacecraft through a heat conductor with flexible connection to a heat-sink in an exo-atmospheric environment.

Removal of heat from heat-generating guidance and electronic equipment on satellites and other spacecraft has been accomplished previously by heat tubes, phase-change medium, and reflectors in various combinations and in conjunction with various other components. This invention, however, employs flexible heat conductors, such as a heat-strap, to convey heat to unique forms of heat-exchangers. Prior art includes the following US patents:

| U.S. Pat. No. | INVENTOR | ISSUE DATE |
| --- | --- | --- |
| 4,706,740 | Mehefkey | Nov. 17, 1987 |
| 4,673,030 | Basilius | Jun. 16, 1987 |
| 4,669,685 | Dalby | Jun. 2, 1987 |
| 4,580,748 | Dalby | Apr. 8, 1986 |
| 4,420,035 | Hewitt | Dec. 13, 1973 |
| 3,749,156 | Fletcher, et al. | Jun. 31, 1973 |
| 3,603,530 | Easton, et al. | Sep. 7, 1971 |
| 3,402,761 | Swet | Sep. 17, 1967 |
| 3,399,717 | Cline | Sep. 3, 1968 |

The Basilius device, for instance, employs a heat tube in tube in combination with a heat-exchange plate. The two Dalby patents utilize reflectors to aid the heat-exchange of specific types of spinning satellites. Hewitt employs arcuate radiator panels in conjunction with heat tubes in a circular spinning satellite. Fletcher et al. uses a combination of heat tubes and louver-shaped cooling panels. Easton et al. uses a mere insulated box with an open end in relation to thermal-control factors of the invention. Swet employs a wick-walled heat tube in relation to a heat-exchange surface. The Cline device employs concentric inner and outer bellows containing vaporizable fluid in an expansible chamber between them with a heat source at one end and a heat sink at the other end.

While each of these devices has some form of advantage, none are conveniently attachable to an exterior of a satellite or other type of spacecraft. All are part of the satellite and designed into its structure. There is yet a great need for a cost-efficient and effective thermal-control device that can be attachable to satellites and other spacecraft without the exorbitant cost of customizing the vehicle to the thermalcontrol device. A space vehicle can be designed with a relatively simple and inexpensive provision for attachment of this thermal-control device.

SUMMARY OF THE INVENTION

The primary objective of this invention is to provide a thermally-efficient thermal-control unit for satellites and other space vehicles.

A second object is to provide a low-cost thermal-control unit for satellites and other spacecraft.

Another object is to provide a light-weight thermal-control unit for satellites and other space vehicles.

Even another object is to provide a thermal-control unit that can be attached to the outside of satellites and other space vehicles with standardized attachment and performance specifications.

A further object is to provide a thermal-control unit that can be extendable from the inside to the outside of a satellite or other space vehicle after being launched into orbit.

An optional objective is to provide a thermal-control unit with shielding against hostile laser-beam heat for military satellites in earth-orbital conditions.

Another object is to provide a passive thermal-control unit for satellites and other space vehicles that does not require or utilize phase-change materials or moving parts.

Still another object of this invention is to provide a thermal-control unit that can expand and contract from heat variations independently of material expansion and contraction of satellites and other space vehicles on which it is used.

The present invention fulfills the above objectives by transferring heat from heat-generating components requiring cooling in a space-vehicle to a radiator plate through a heat-conductive sleeve in thermal-communication contact between the radiator plate and a base plate. Heat can also be conducted to the heat-conductive cylinder through a flexible heat strap. The base plate can be attachable to the outside or to the inside surface of a exterior portion of the space vehicle. If attachable to the inside surface or to an instrument inside the space vehicle which requires cooling, the entire thermal-control device can be extendable from an inside position in the vehicle. A cold plate with optional laser-beam and heat-deflective construction can be positioned at the opposite side of the radiator plate from the base plate and can be swivelable to maximize resistance of sun heat or hostile laser beams. The space vehicle can be any form of spinning or non-spinning satellite or space-transportation vehicle. These and other objectives of this invention will be apparent to those skilled in the art where the preferred embodiments are described in conjunction with the drawings.

BRIEF DESCRIPTION OF THE DRAWINGS

This invention is described in claims in accordance with the following specification and drawings wherein:

DESCRIPTION OF THE PREFERRED EMBODIMENTS

Figure 1:
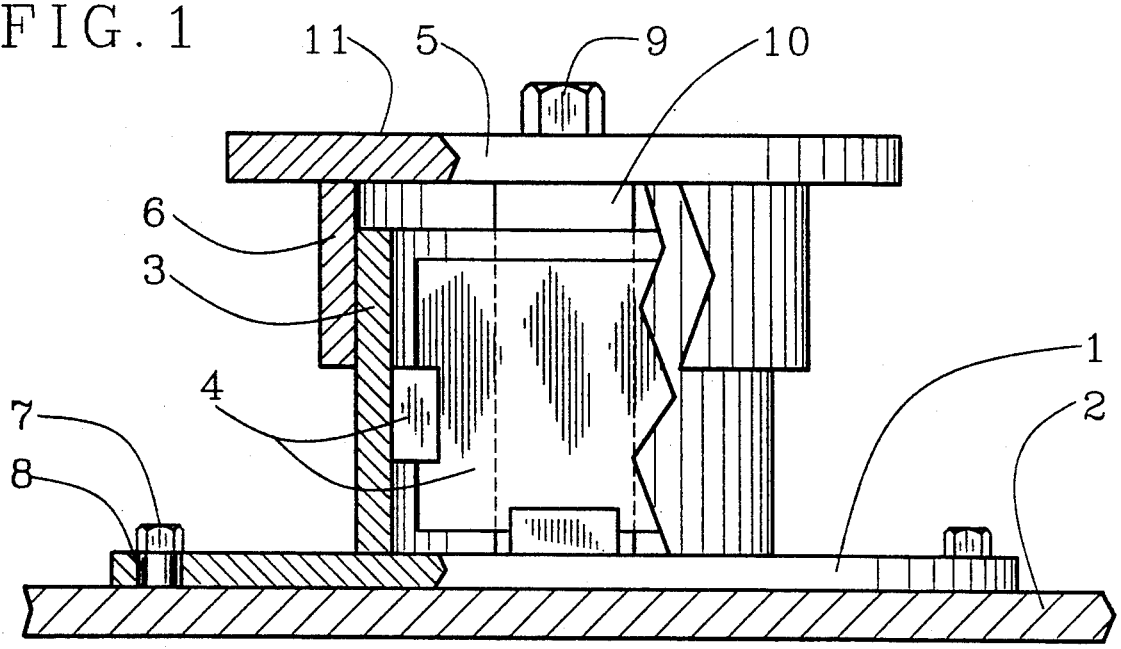
FIG. 1 is a cutaway side view of this invention attached to the outside of a satellite or other space vehicle with heat-source components requiring heat dissipation positionable inside of the thermal-control unit.

Referring to FIG. 1, a base plate 1 is attachable flexurally to a space vehicle 2. A heat-conductive cylinder 3 or with the space vehicle 2. The heat is transferred from heat-conductive cylinder 3 to heat radiator 5 through heat-conductive sleeve 6.

Flexural attachment of the base plate 1 to the space vehicle 2 can be by means of a fastener bolt 7 with a selectively-oversized fastener orifice 8. This means of attachment is for direct attachment to an outside wall of a space vehicle.

Optionally for attachment directly to the outside of a space vehicle, a central attachment bolt 9 can be employed with contractible bias between the heat radiator 5 and the space vehicle 2 or the base plate 1. The trade-off advantage of the central attachment bolt is inherent adjustability to differences in coefficient of heat expansion, provided sufficient elasticity is provided in the fastener 9 or in the components between the space vehicle 2 and in the heat radiator 5.

Fastener heat-resistance material 10 can be employed if necessary to minimize heat transmission through fastener 9.

The heat-dissipation surface 11 of heat radiator 5 can be painted and polished appropriately in accordance with know methods of reflecting heat.

Figure 2:
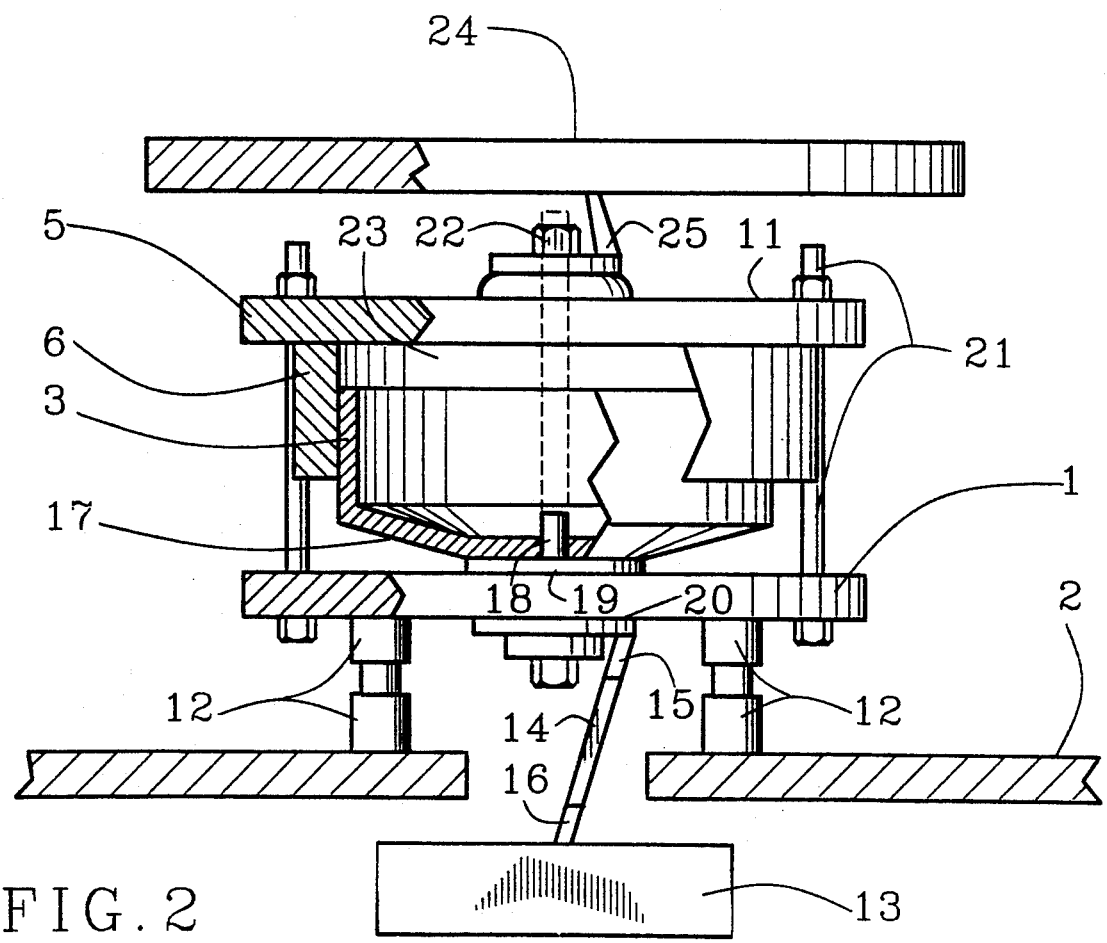
FIG. 2 is a cutaway side view of the invention with flexible attachment of a heat conductor to heat-source components in the spacecraft.

Referring to FIG. 2, the base plate 1 is attachable to the space vehicle 2 with flexural connectors 12 which can compensate for differences in material heat expansion in this embodiment of the invention.

Heat-load interface between spacecraft-positioned heat-source components 13, such as an instrument, and the heat-conductive cylinder 3 can be provided by a heat conductor 14. The heat conductor 14 can be a rigid type of heat conductor with a heat-exchange end 15 and or a heat-source end 16 or both ends 15 and 16 flexible to compensate for heat expansion of parts. Alternatively, the heat conductor 14 can be a flexible heat strap.

The heat-conductive cylinder 3 can be provided with a cylinder-head portion extended inwardly and optionally coned to a domed cylinder head 17. A central cylinder-head bolt 18 can be used to fasten the cylinder 3 to the base plate 1. Optimally, a high-heat-conductive connector plate 19 can be positioned between a conductor attachment ring 20 and the cylinder heat 17. The connector plate 19 can be extended through the base plate 1 or, optionally, the base plate 1 also can be constructed of a high-conductor material. The connector plate 19 and the conductor ring 20 can be constructed of a conductor material such as indium or other material comprised of other fusible-metal alloys.

The heat radiator 5 and the base plate 1 can be fastened together by construction bolts 21 having low thermal conductivity at their outward edges. The construction bolts 21 can be provided with sufficient elasticity with suitable length-per-diameter or with appropriately-springed washers. Alternatively, the base plate 1 and the heat radiator 5 can be fastened together with the heat-conductive cylinder 3 and the heat-conductive sleeve 6 encompassed between them by the extension of head bolt 18 through heat radiator 5 to an opposite fastener member 22.

The FIG. 2 embodiment of the invention can contain heat-source component within the cylinder 3 or they may be positioned in the spacecraft as illustrated. Optionally also, heat-source components 13 may be positioned both in the space vehicle 2 and in the cylinder 3. A space 23 is located between the cylinder 3 and the heat radiator 5.

A cold plate 24 can be positioned outwardly from heat radiator 5 with a cold-plate conductor 25 in heat communication between the heat radiator 5 and the cold plate 24. The cold plate 24 provides a heat shield for the heat radiator 5 in addition to another heat-dissipation medium.

Heat shielding is particularly effective in space conditions because there are no heat-conductive gases or particles to convey heat at angles from solar rays. The cold plate 24, therefore, increases heat-dissipation of the heat radiator 4 in addition to providing its own additional heat-dissipation capacity.

Figure 3:
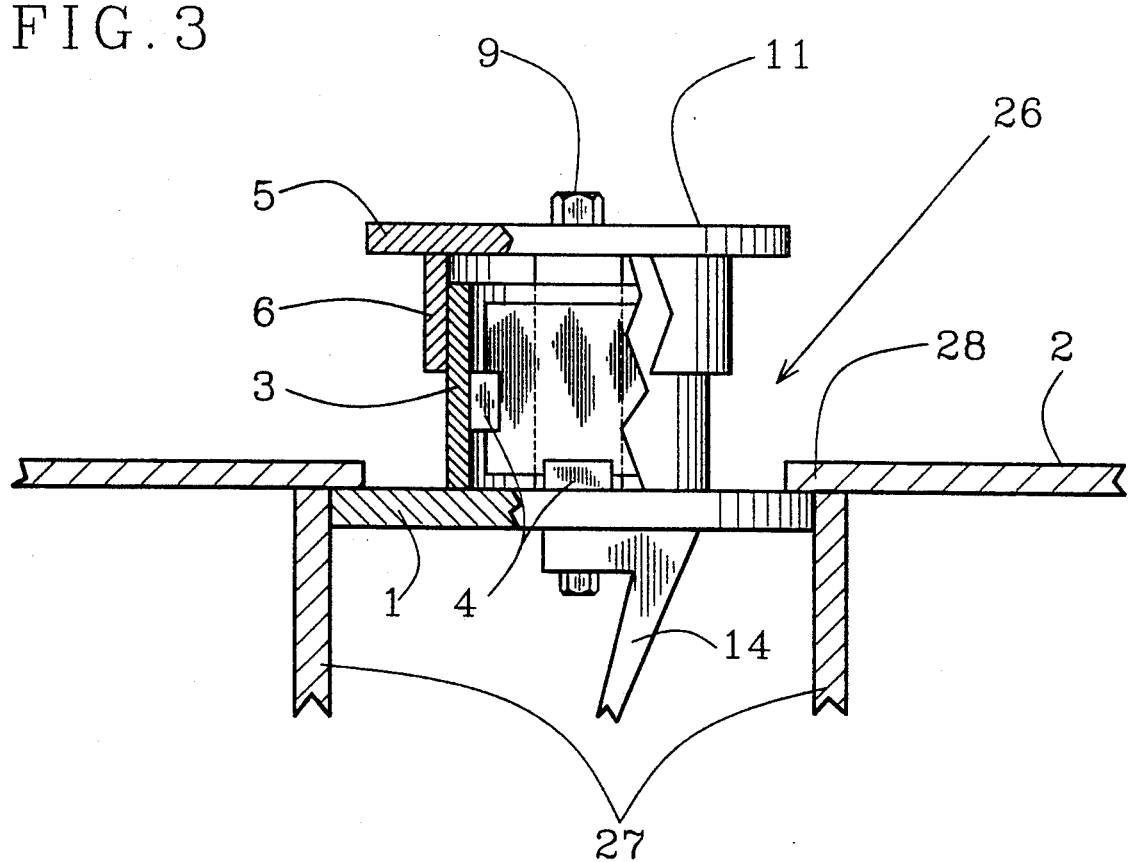
FIG. 3 is a cutaway side view of an embodiment of the FIG. 1 illustration of the invention extendable from inside of a satellite.

Referring to FIG. 3, a thermal-control orifice 26 in a space vehicle 2 can be provided with extension ways 27 along which base plate 1 is slidable from within the space vehicle 2 to a position in contact with a keeper 28 at an inside portion of the exterior of space vehicle 2. A heat conductor 14 can be employed to conduct heat from components within the space vehicle 2 in addition to conducting heat from heat-source components 4 within the heat-conductive cylinder 3.

The space vehicle 2 illustrated in FIG. 3 is intended to represent either the non-spinning portion of a spinning earth-orbital satellite or a select portion of a non-spinning type of earth-orbital satellite.

Figure 4:
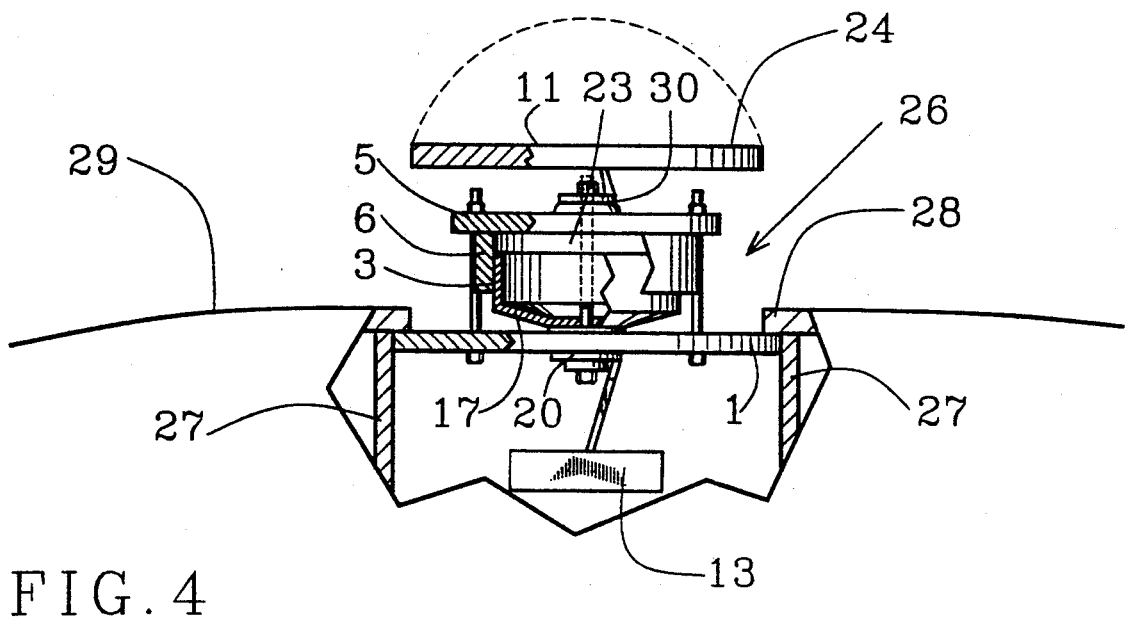
FIG. 4 is a cutaway side view of the FIG. 2 illustration of the invention extendable from inside of a space-transportation vehicle.

Referring to FIG. 4, a transportation spacecraft 29 can be provided with an appropriately-adapted extension way 27 and keeper 28 at a thermal-control orifice 26 for extendable attachment of either the FIG. 1 or the FIG. 2 embodiment of this invention. Typically, extendable attachment would be employed for positioning this invention within a spacecraft during launch conditions and then extending it during earth-orbital conditions. If the satellite is carried aboard a type of shuttle craft to exo-atmospheric environment, then the extension feature is less significant than if it is launched separately.

The cold plate can be optionally coned and constructed to deflect hostile laser beams in the event that it is used for select military applications. The same construction can better deflect suns rays also. A selectively-swivelable connection 3 to the heat radiator 5 can be provided for orienting a coned or non-coned cold plate appropriately in relation to hostile laser beams or solar radiation.

A wide variety of mathematical possibilities of combinations of parts of this invention are foreseeable. Either embodiment of the invention can be used with either type of heat-conductive cylinder, for instance. Either type of attachment method can be used with either embodiment or with any combination of components and with any type of spacecraft. Other modifications, adaptions, variations and arrangements of parts of this invention also are foreseeable.

Included in this invention, are all modifications, adaptions, forms, applications and mathematically-possible combinations of components that are foreseeable from description in the following claims.

Having thus described my invention, I claim:

1. A spacecraft thermal-control apparatus comprising:
    a base attachable to an exterior portion of a spacecraft;
    a heat radiator positionable at a select distance from the base and attachable to the base with support means;
    a heat-conductive sleeve in heat-conductive attachment to the heat radiator;
    a heat-conductive cylinder in heat-communication relationship between the base and an inside periphery of the heat-conductive sleeve; and
    a heat-conductor in heat-communication relationship between the heat-conductive sleeve and components of the spacecraft requiring cooling.

2. A spacecraft thermal-control apparatus according to claim 1 wherein an inside periphery of the heat-conductive sleeve is in slidable contact with an outside periphery of the heat-conductive cylinder.

3. A spacecraft thermal-control apparatus according to claim 1 and further comprising:
a heat-conductive head of the heat-conductive cylinder attachable to the base.

4. A spacecraft thermal-control apparatus according to claim 1 and further comprising:
a heat-conductive plate in heat-conductive contact with the heat radiator and a radiator-end portion of the heat-conductive cylinder.

5. A spacecraft thermal-control apparatus according to claim 1 wherein a surface of the radiator is coated and polished appropriately for achieving a select heat-mirror effect.

6. A spacecraft thermal-control apparatus according to claim 1 wherein the heat-conductive sleeve is a select graphite-epoxy material.

7. A spacecraft thermal-control apparatus according to claim 1 wherein the heat-conductive cylinder is a select high-heat-conductive aluminum alloy.

8. A spacecraft thermal-control apparatus according to claim 1 wherein the base is a heat-resistive material and the heat conductor is in heat-communication relationship with a heat-conductive-cylinder head of the heat-conductive cylinder.

9. A spacecraft thermal-control apparatus according to claim 1 wherein the base is selectively heat-conductive and is in heat-communication with the heat conductor.

10. A spacecraft thermal-control apparatus according to claim 1 wherein walls of the heat-conductive sleeve, the heat-conductive cylinder, the heat radiator and the base are sized and shaped for positioning heat-source equipment requiring heat dissipation inside of a thermal-control enclosure formed by said walls.

11. A spacecraft thermal-control apparatus according to claim 10 wherein the said heat-source equipment is in heat-communication relationship with select inside walls of the said thermal-control enclosure.

12. A spacecraft thermal-control apparatus according to claim 1 and further comprising:
a select high-heat-conductive material such as indium and other materials of the fusible-metal type in heat conductive contact between the heat conductor and a select portion of the of the heat-conductive cylinder.

13. A spacecraft thermal-control apparatus according to claim 1 wherein the heat-conductive sleeve is comprised of a material with a coefficient of thermal expansion of the heat-conductive cylinder.

14. A spacecraft thermal-control apparatus according to claim 1 and further comprising:
a central radiator support member in selectively-contractible fastener relationship between the base and the radiator.

15. A spacecraft thermal-control apparatus according to claim 14 and further comprising:
walls of the heat-conductive sleeve, the heat-conductive cylinder, the heat radiator and the base which are sized and shaped for positioning heat-source equipment requiring heat dissipation inside of a thermal-control enclosure formed by said walls; and
selectively low thermal conductivity of the central radiator support member.

16. A spacecraft thermal-control apparatus according to claim 1 wherein attachment of the base to the spacecraft is flexural.

17. A spacecraft thermal-control apparatus according to claim 1 wherein flexural attachment of the base to the spacecraft is comprised of a selectively over-size slotted fastener orifice in the base and a fastener insertable therein in fastener relationship between he base and a select portion of an exterior of the spacecraft.

18. A spacecraft thermal-control apparatus according to claim 1 wherein flexural attachment of the base to the spacecraft is comprised of selectively resilient attachment members in fastener relationship between a select portion of the base and a select portion of the spacecraft.

19. A spacecraft thermal-control apparatus according to claim 1 and further comprising fastener members in selectively-biased fastener relationship between the base and the radiator at a position outside of the heat-conductive cylinder.

20. A spacecraft thermal-control apparatus according to claim 1 and further comprising:
a cold plate positionable at a select distance from the radiator; and
a heat conductor in heat-communication relationship between the heat radiator and the cold plate.

21. A spacecraft thermal-control apparatus according to claim 20 and further comprising:
selectively-swivelable contact of the cold plate to the heat radiator.

22. A spacecraft thermal control apparatus according to claim 20 wherein a surface of an opposite side of the cold plate from the heat rediator is selectively shaped and constructed to deflect hostile laser beams and solar heat.

23. A spacecraft thermal control apparatus according to claim 21 wherein a surface of an opposite side of the cold plate from the heat radiator is selectively shaped and constructed to deflect hostile laser beams and solar heat.

24. A spacecraft thermal control apparatus according to claim 1 wherein the exterior poriton of the spacecraft to which the base is attachable is on an inside periphery of the exterior portion of the spacecraft and further comprising:
a thermal-control-unit orifice sized and shaped to allow passage of a select portion of the spacecraft thermal-control apparatus;
thermal-control-unit-extension ways in slidable contract with the base in the spacecraft; and
an attachment surface at an inside portion of the exterior of the spacecraft.

25. A spacecraft thermal-control apparatus according to claim 1 wherein the spacecraft is an orbital satellite having a relatively non-spinning portion for attachment thereto.

26. A spacecraft thermal control apparatus according to claim 1 wherein the spacecraft is a transportation space vehicle having suitable portion for attachment thereto.

27. A spacecraft thermal control apparatus according to claim 1 wherein the heat conductor is a flexible heat-strap.

28. A spacecraft thermal control apparatus according to claim 1 wherein the heat conductor is a rigid heat conductor of a select type with a flexible portion between heat-source components and the heat radiator.

29. A spacecraft thermal control apparatus according to claim 1 and further comprising:

walls of the heat-conductive sleeve, the heat-conductive cylinder, the heat radiator and the base which are sized and shaped for positioning heat-source equipment requiring heat dissipation inside of a thermal-control enclosure formed by said walls and wherein a thermal switch incorporated into a space-qualified electronics box is positionable within the said thermal-control enclosure.

30. A method for construction of a spacecraft heat-control apparatus consisting of:

a base attachable to an exterior portion of a spacecraft;

a heat radiator positionable at a select distance from the base and attachable to the base with support means;

a heat-conductive sleeve in heat-conductive attachment to the heat radiator;

a heat-conductive cylinder in heat-communication relationship between the base and an inside periphery of the heat-conductive sleeve; and a heat-conductor in heat-communication relationship between the heat-conductive sleeve and components of the spacecraft requiring cooling;

consisting of the following steps:

a. fabricating the heat-conductive cylinder to design specifications;

b. forming the heat-conductive sleeve with inside diameter selectively fitting the outside diameter of the heat-conductive-cylinder walls;

c. bonding the radiator to an outside end of the heat conductive sleeve, using a bonding method that does not distort dimensions of the heat-conductive sleeves;

d. bonding the circular aluminum plate to the base at a temperature selectively above the temperature for fabrication of the heat-conductive sleeve;

e. installing support-fastener members in contact between the base and the heat radiator at a selectively-elevated temperature;

f. mounting the parts assembled above to a spacecraft with a flexural connection; and g. positioning the heat conductor in selectively-flexible heat-communication contact between select components on the spacecraft and the heat-conductive cylinder.

31. A method according to claim 31 wherein the order of steps b. and c. are reversed such that the heat-conductive sleeve is bonded to the heat plate before its inside periphery is fitted to the outside periphery of the heat-conductive cylinder.

* * * * *